Sept. 15, 1953 C. WEBBEKING 2,651,878
NOVELTY FLY SWATTER
Filed March 13, 1950
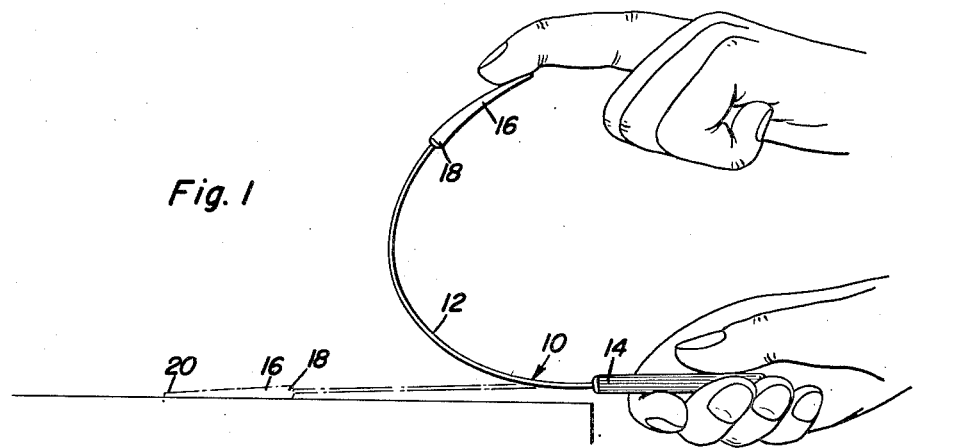
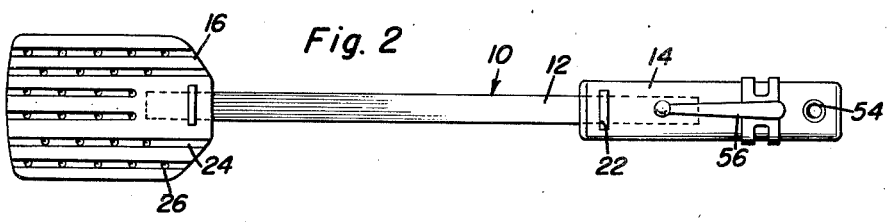
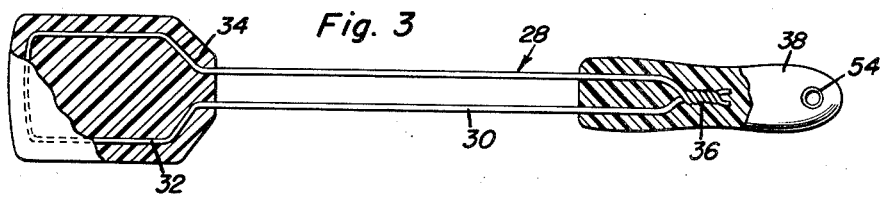
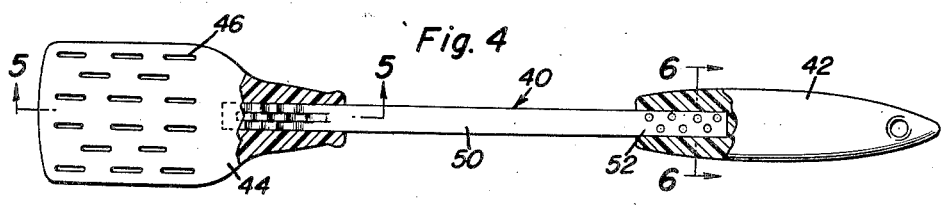
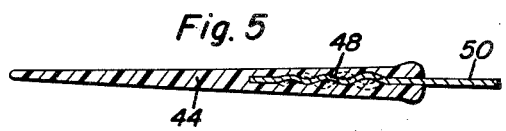
Carl Webbeking
INVENTOR.
BY *Clarence A. O'Brien and Harvey B. Jacobson*
Attorneys

Patented Sept. 15, 1953

2,651,878

UNITED STATES PATENT OFFICE 2,651,878

NOVELTY FLY SWATTER

Carl Webbeking, Cleveland, Ohio

Application March 13, 1950, Serial No. 149,273

1 Claim. (Cl. 43—137)

This invention appertains to a novelty fly swatter which can be used as a desk ornament and which is constructed in such a manner as to swat flies without causing objectionable spots on a surface.

The primary object of this invention is to provide a novelty constructed pocket size fly swatter in which both hands of the user are employed in aiming and releasably actuating said fly swatter.

Another important object of this invention is to provide an inexpensive, compact and durable device which can be used for advertising purposes and which can be conveniently used in a novel manner for swatting flies.

These and ancillary objects and structural features of merit are attained by this invention, the preferred embodiment of which is set forth in the following description and illustrated in the accompanying drawing, wherein:

Figure 1 is a side elevational view of one embodiment of this invention, illustrating the same in use;

Figure 2 is a top plan view of the swatter illustrated in Figure 1;

Figure 3 is a plan view of another embodiment of this invention, with part of the handle and swatter or paddle shown in section;

Figure 4 is a plan view of another embodiment of this invention with part of the handle and swatter in section;

Figure 5 is a longitudinal vertical sectional view taken on line 5—5 of Figure 4, and Figure 6 is a transverse sectional view taken on line 6—6 of Figure 4.

In the accompanying drawing, attention is first directed to Figures 1 and 2, wherein the fly swatter 10 is shown in use and includes an elongated flexibly resilient retractable and projectable leaf spring 12 on the ends of which the thermo-plastic handle 14 and the paddle 16 are secured. The handle 10 is of a greater length than width. In construction, the leaf spring 12 will be positioned in a die and the paddle 16 and handle 14 will be molded or cast on the ends of the bar. The paddle 16 can be formed from various materials, such as leather, rubber, plastic or the like. The paddle 16 is of a width substantially corresponding to the width of a human finger and of a length not less than the distance from the free end of the finger to the first joint thereof.

The paddle 16 is longitudinally wedged shaped in cross section so that the thicker portion 18 provides reinforcement around the end of the bar 12, while the thinner end 20 has greater flexibility. As seen in Figure 1 the swatter is used by gripping the handle 14 by the thumb and fingers of one hand and bending the leaf spring 12 by holding the paddle 16 by a finger of the other hand so that the leaf spring 12 functions to urge the paddle onto a surface. Clips 22 are provided to reinforce the connection between the bar and the handle and paddle 16.

Of course, advertising matter can be inscribed on the spring 12. Also, it is to be noted that the swatter 10 will be less than 12 inches in length or substantially the length of a hand of a human and thus can be used as a desk ornament or similar device. Also to prevent spots or objectionable splotches on a surface, when the paddle 16 strikes a fly, longitudinal grooves 24 and communicating transverse openings 26 are formed in the paddle.

In Figure 3 another embodiment 28 of this invention is illustrated, the swatter 28 being similar to the swatter 10 but having a wire connecting member 30 connected between the handle and paddle. The member 30 is a single length of wire bent upon itself at its middle to form a substantially rectangular frame 32 on which the imperforate paddle 34 is molded. The ends of the wire are twisted upon themselves as at 36 and the substantially cylindrical handle 38 is molded thereon.

In Figure 4, another embodiment 40 of this invention is depicted, the swatter 40 comprising an elongated elliptical shaped handle 42 and a wedge shaped swatter or paddle 44 having spaced longitudinal slots 46 transversely formed therein. The paddle 44 is formed to simulate a bottle and is molded on the undulated or crimped end 48 of a spring 50. The opposing end 52 of the bar is perforated and the handle 42 is molded thereon.

The handles of the swatters may be formed with transverse openings 54 to receive any desired means whereby the swatter may be hung on a vertical support. For personal carrying purposes, a clip 56 formed with a sleeve may be positioned on the handles, as seen in Figure 2, or if desired, the clip may be molded in the handle.

As to the mode of operation of the fly swatter, it should be noted that this pocket size device is held by both hands of the user. The handle is ordinarily gripped with the thumb of one hand resting against one surface and the fingers against the other surface. The free end of the paddle is held by a finger of the other hand and pulled back toward the handle in a manner to cock and tension the retractible and projectable spring so that the paddle may be accurately aimed at the target and released at the moment the desired range is found.

It is important to note that the leaf spring, handle, and blade are of such a length that an operator may support the handle with one hand and flex the leaf spring by placing and pressing a finger against the paddle so that the paddle will be substantially within a finger's distance from and substantially above the handle for release by the latter finger to permit the paddle to strike an object substantially in line with the handle and paddle and within the limit of a distance of the first hand of the operator to the object substantially corresponding to the length of the fly swatter.

Having described the invention, what is claimed as new is:

A fly swatter of substantially the length of a hand of a human, said fly swatter comprising a handle of greater length than width, its length and width being sufficient to enable gripping thereof by two or more fingers and the thumb of one hand, a paddle of a width substantially corresponding to the width of a human finger and of a length not less than the distance from the free end of the finger to the first joint thereof, said paddle having a cross section longitudinally giving the paddle a wedge-shape with the point of the wedge at the free end thereof, and a leaf spring having one end thereof embedded in the paddle at the thicker end thereof, its opposite end being embedded in the handle, the leaf spring, handle, and paddle being of such length that an operator may support the handle with one hand and flex the leaf spring by placing and pressing a finger against the paddle so that the paddle will be within approximately a finger's distance from and substantially above the handle for release by the latter finger to permit the paddle to strike an object substantially in line with the handle and paddle and within the limits of a distance from the first hand to the object substantially corresponding to the length of the fly swatter.

CARL WEBBEKING.

References Cited in the file of this patent

UNITED STATES PATENTS

| Number | Name | Date |
|---|---|---|
| 479,102 | Willbrandt | July 19, 1892 |
| 1,018,244 | Jackson | Feb. 20, 1912 |
| 1,206,773 | Boyle | Nov. 28, 1916 |
| 1,237,346 | Limoges | Aug. 21, 1917 |
| 1,299,580 | Krumlaw | Apr. 8, 1919 |
| 1,412,312 | Little | Apr. 11, 1922 |
| 1,650,548 | Sullivan | Nov. 22, 1927 |
| 1,882,291 | Monroe | Oct. 11, 1932 |
| 1,939,838 | Wasson | Dec. 19, 1933 |
| 1,966,954 | Monroe | July 17, 1934 |
| 2,052,819 | Gollan | Sept. 1, 1936 |
| 2,077,132 | Shafter | Apr. 13, 1937 |
| 2,096,940 | Platt | Oct. 26, 1937 |